United States Patent Office 3,487,710
Patented Jan. 6, 1970

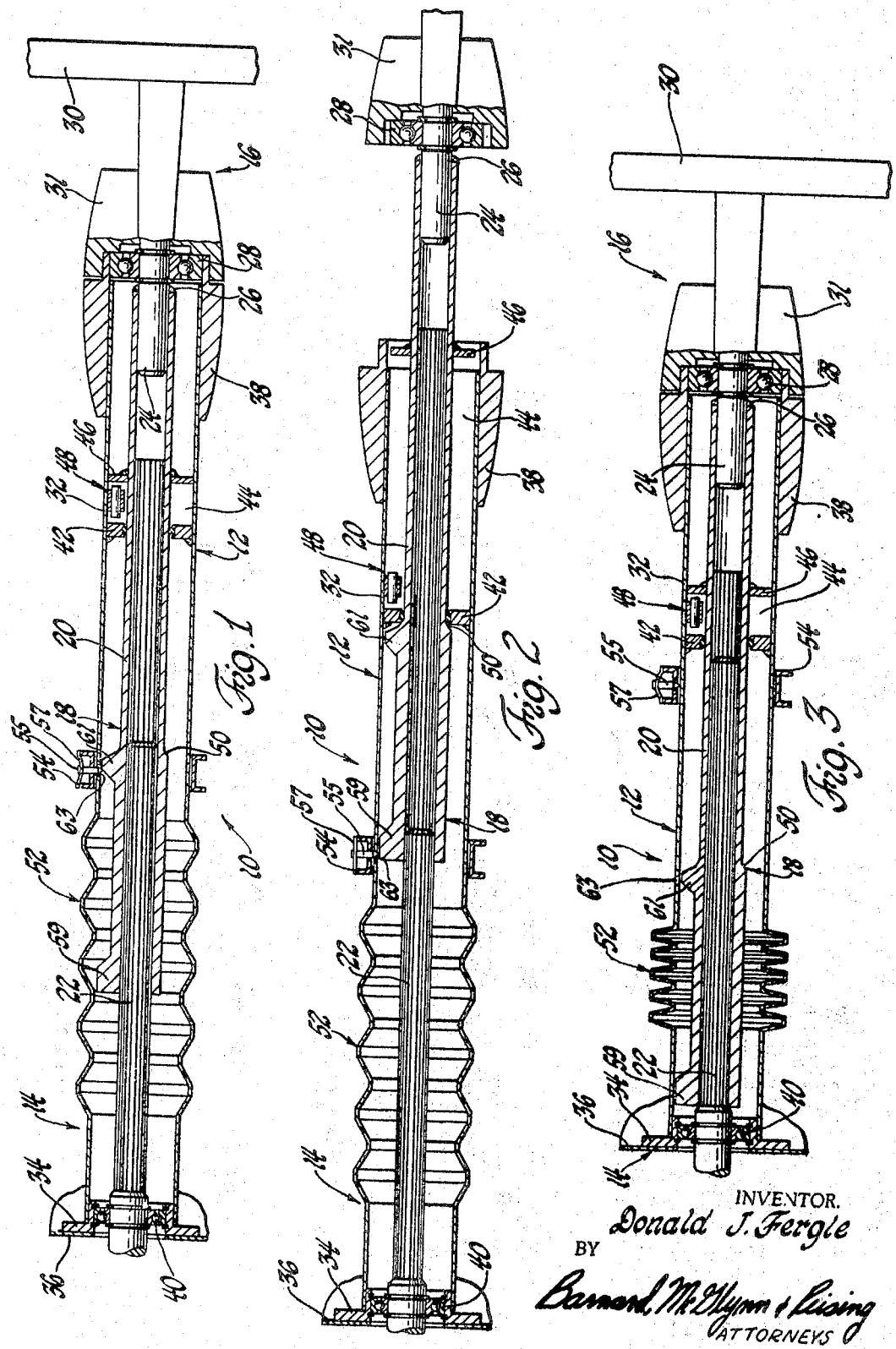

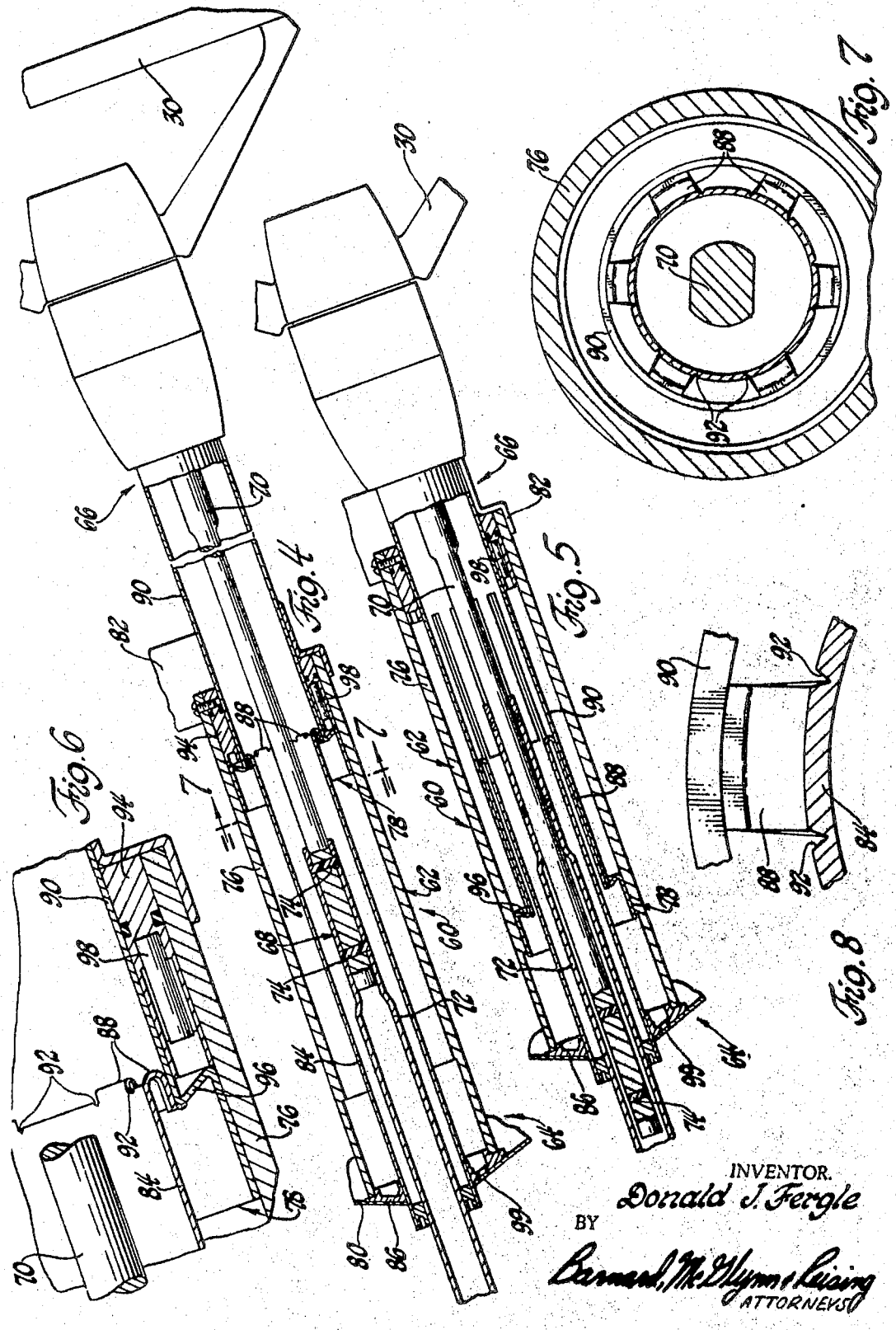

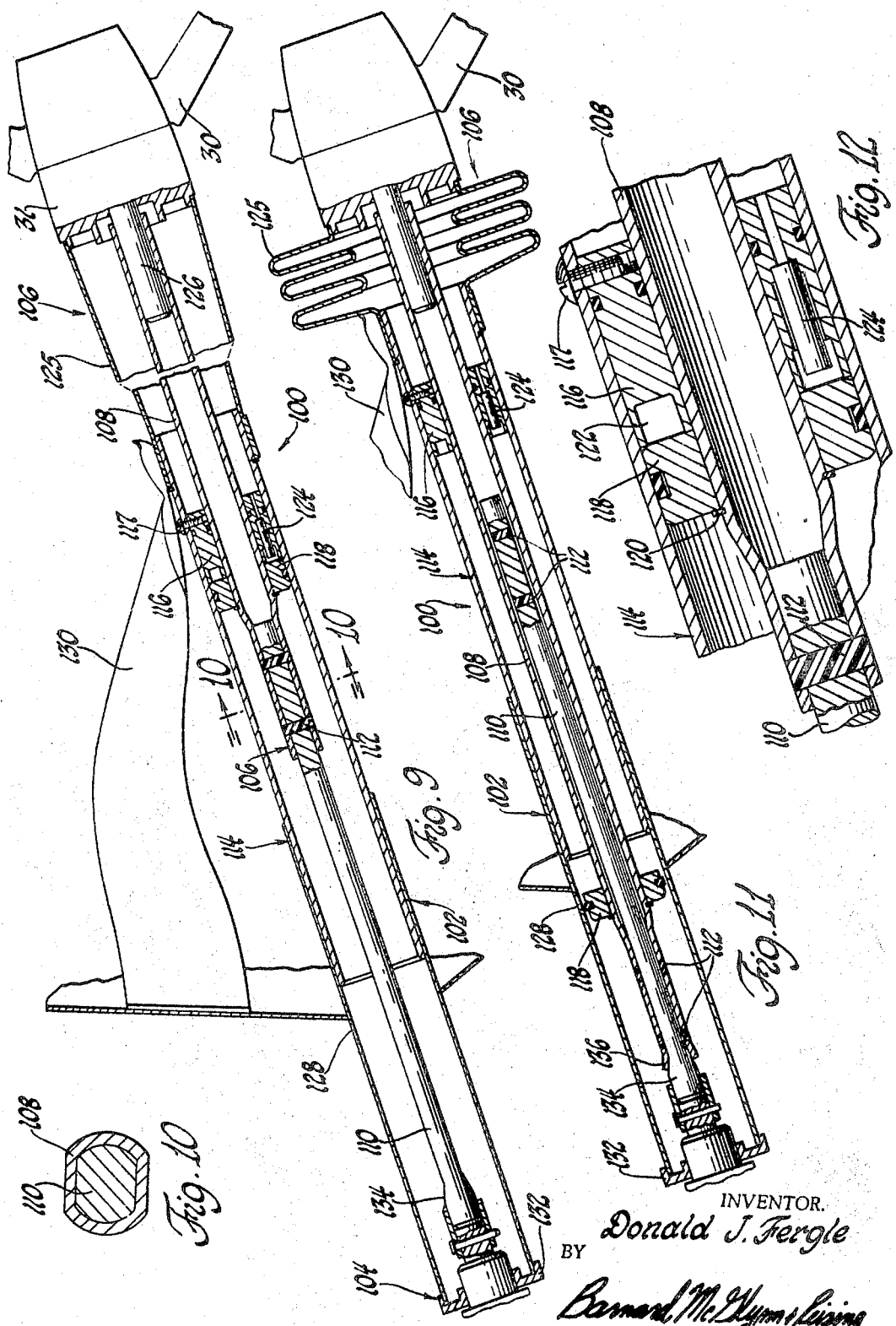

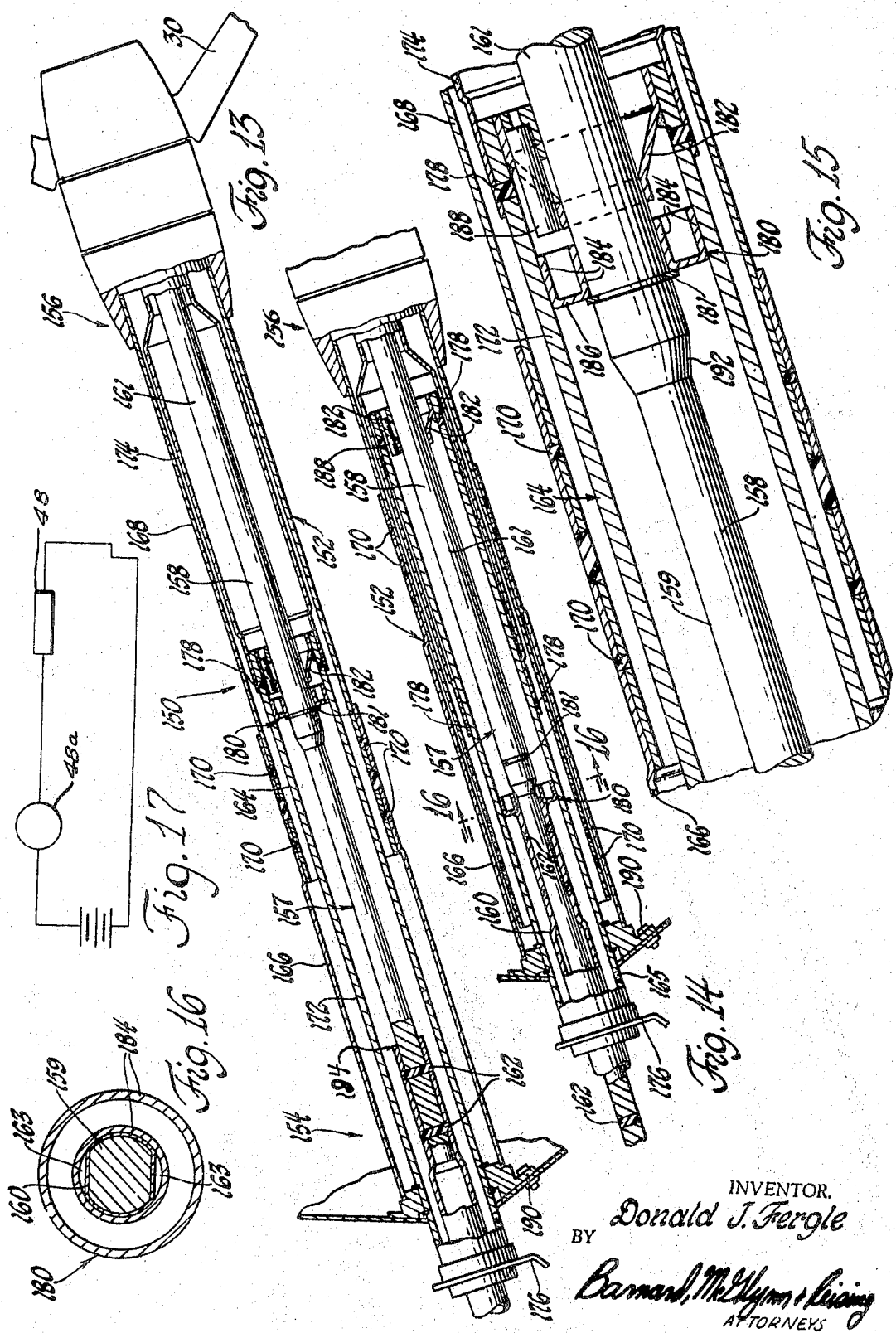

3,487,710
STEERING COLUMNS
Donald J. Fergle, St. Clair Shores, Mich., assignor to Eaton Yale & Towne Inc., Cleveland, Ohio, a corporation of Ohio
Filed Feb. 17, 1967, Ser. No. 616,917
Int. Cl. B62d 1/18
U.S. Cl. 74—492
43 Claims

ABSTRACT OF THE DISCLOSURE

A steering column having relative telescoping members which are normally prevented from moving relative to one another. A piston is attached to certain of said members and forming a chamber in which is disposed an explosive charge so that the members are telescoped relative to one another upon activation of the explosive charge. An outwardly tapered portion on one of the telescoping members is for engaging and deforming the other telescoping member so that as the members are telescoped together in response to the activation of the explosive charge, the members are wedged together to be prevented from telescoping apart.

---

Recently, there has been a large amount of talent and capital expended in the research and development of various safety devices for vehicles and particularly automobiles. Much of this effort has been expended in an attempt to solve the problems associated with the steering column in an automobile.

Until recently, steering columns actually utilized in automobiles were rigid so that during a crash, the operator of the automobile frequently suffered serious or fatal injuries as a result of impacting against the outward end of the steering column. Recently, various embodiments and variations of collapsible steering columns have been utilized so that the steering column collapses if the operator impacts thereagainst with a sufficient force.

Collapsible steering columns per se have not proven entirely satisfactory, however. During the normal operation of an automobile, the operator is sitting in spaced relationship to the steering wheel which is operatively attached to the outward end of the steering column. Normally, when a crash occurs, the automobile rapidly decelerates and the operator is thrust forward toward the steering wheel and the outward end of the steering column. During a crash the operator of the automobile moves toward the steering wheel with an ever-increasing velocity, i.e., the operator accelerates when moving forward from the normal seating position. Hence, at the time the operator impacts with the end of the steering column, his forward velocity is very high. As is well known from elementary physics, the greater the velocity at the time of impact, the greater will be the impact force. Thus, when a collapsible steering column is utilized, the outward end of the steering column which supports the steering wheel is in a stationary position relative to the operator of the vehicle when the operator of the vehicle moves forward as a result of the crash. Consequently, even if the steering column is collapsible, the space between the operator of the vehicle and the outward end of the steering column is sufficient so that during a crash the operator engages or impacts with the steering column with sufficient force to cause very serious and often fatal injuries even though the steering column collapses after this impact. Therefore, even when suitable collapsible steering columns are utilized, the operator of the vehicle frequently incurs serious or fatal injuries as a result of the impact force in engaging the steering column or steering wheel when moving forward from the normal operating position during a crash.

Accordingly, it is an object and feature of this invention to provide a steering column assembly which significantly reduces or eliminates a violent impact between the operator of an automobile and the end of a steering column supporting a steering wheel.

Another object and feature of this invention is to provide a steering column assembly adapted for supporting a steering wheel and which moves the steering wheel outward to a position immediately adjacent the operator before the operator begins any significant forward movement as a result of a crash thereby to reduce the impact force resulting from the operator engaging the steering wheel.

A further object and feature of this invention is to provide a steering column assembly adapted to support a steering wheel and including means to move the steering wheel outward to a position immediately adjacent the operator of the vehicle before the operator begins any significant forward movement as a result of the crash of the vehicle and including energy absorbing means to absorb the energy resulting from the subsequent forward movement of the operator and the steering wheel.

Yet another object and feature of this invention is to provide a steering column assembly including members which telescope one into the other and include coacting portions which are forced into wedging engagement with one another to prevent the telescoping members from moving apart or rebounding.

Another object and feature of this invention is to provide a steering column assembly having a column means which telescopes together for retracting the steering wheel end in response to the activation of an explosive means and including means to prevent the telescoping apart or rebound movement.

A still further object and feature of this invention is to provide a steering column assembly which is collapsible and utilizes a novel energy absorbing means to absorb the energy resulting from the force applied to collapse the steering column.

In general, these and other objects and features of this invention may be attained in any one of various embodiments of a steering assembly including a steering column having first and second ends. There is included steering shaft means comprising at least two shaft members disposed in telescopic relationship with one another and restraining means comprising shear pins, or the like, normally preventing relative telescoping movement between the shaft members but allowing relative telescopic movement between the shaft members in response to a predetermined force. A housing means is also included and surrounds the shaft members. The housing means, depending upon the particular column means utilized, may include shifting members adapted to be connected to the transmission of a vehicle for operation thereof. A piston is operatively connected to one of the shaft members and coacts with the housing means to form a chamber. An explosive charge is disposed in or is in communication with the chamber so that upon activation or detonation thereof, gases are generated and act upon the piston to shear the shear pins and to move the shaft members relative to one another in telescoping movement. In one embodiment of the invention, the shaft members are moved apart to extend their total effective length when the explosive charge is activated whereby the steering wheel normally attached to one of the shaft members is moved outward to a position closely adjacent the operator of the vehicle. One of the shaft members includes an outwardly tapered portion which is forced into wedging engagement with a part of the housing means to prevent further relative movement in either direction between the shaft members and the housing means. In this embodiment, there is also preferably included an energy absorbing means forming a part of the housing means so that as the operator of the vehicle and the steering wheel move in the opposite direction as a result of forward movement of the operator, the shaft members telescope one into the other as the shaft member having the outwardly tapered portion is prevented from moving relative to the housing means and the energy created by the forward movement of the operator is dissipated by the energy absorbing means. This energy absorbing means also allows the steering column to collapse while absorbing energy during a sub-critical crash—a sub-critical crash being one not serious enough to cause an appropriate sensing means to actuate the explosive charge and extend the total effective length of the shaft members. In other embodiments, the shaft members are telescoped one into the other to reduce the total effective length of the steering column when the explosive charge is activated or detonated. In one such embodiment, there is also included a novel energy absorbing means which allows the steering column to collapse in a sub-critical crash while absorbing energy. In another embodiment, the shaft members are telescoped together as a result of the activation or detonation of the explosive charge to move the steering wheel away from the operator of the vehicle and include an outwardly tapered portion on one of the shaft members so that as the shaft members telescope together, one of the shaft members moves over the outwardly tapered portion and is deformed so that the shaft members are retained in such a position by a wedging coaction therebetween, thus preventing rebound or a return of the shaft members to the original position. In the remaining illustrated embodiment, the piston is secured to one of the shaft members so that after detonation of the explosive charge and a sudden halt of the movement of the shaft member to which the piston is secured, the piston will break free of the shaft member and move therealong and ram into the other shaft member. The shaft members have a cross section which allows gases resulting from detonation of the explosive charge to flow between the piston and the shaft member along which the piston moves as the piston is approaching the other shaft member. When the piston rams into the other shaft member, the other shaft member is deformed and wedged into engagement with the shaft member from which the piston breaks away, thus preventing the shaft members from moving relative to one another in the opposite direction.

Other objects and attendant advantages of the present invention will be readily appreciated as the same becomes better understood by reference to the following detailed description when considered in connection with the accompanying drawings wherein:

FIGURE 1 is a cross-sectional view of a preferred embodiment of the steering column assembly of the instant invention;

FIGURE 2 is a cross-sectional view of the embodiment illustrated in FIGURE 1 and showing the steering column assembly in the extended position;

FIGURE 3 is a cross-sectional view of the embodiment illustrated in FIGURE 1 and showing the steering column assembly in the collapsed position without the explosive charge having been detonated;

FIGURE 4 is a cross-sectional view of another preferred embodiment of the steering column assembly of the instant invention;

FIGURE 5 is a cross-sectional view of the embodiment illustrated in FIGURE 4 and showing the steering column assembly in the collapsed or retracted position;

FIGURE 6 is an enlarged fragmentary cross-sectional view of a portion of the embodiment illustrated in FIGURE 4;

FIGURE 7 is an enlarged fragmentary cross-sectional view taken substantially along line 7—7 of FIGURE 4;

FIGURE 8 is an enlarged fragmentary cross-sectional view showing a portion of the view illustrated in FIGURE 7;

FIGURE 9 is a cross-sectional view of yet another preferred embodiment of the steering column assembly of the instant invention;

FIGURE 10 is an enlarged cross-sectional view taken substantially along line 10—10 of FIGURE 9;

FIGURE 11 is a cross-sectional view of the embodiment illustrated in FIGURE 9 and showing the steering column assembly in the collapsed or retracted position;

FIGURE 12 is an enlarged fragmentary cross-sectional view of a portion of the embodiment illustrated in FIGURE 9;

FIGURE 13 is a cross-sectional view of a further preferred embodiment of the steering column assembly of the instant invention;

FIGURE 14 is a cross-sectional view of the embodiment illustrated in FIGURE 13 and showing the steering column assembly in the collapsed or retracted position;

FIGURE 15 is an enlarged fragmentary cross-sectional view of a portion of the embodiment illustrated in FIGURE 13;

FIGURE 16 is an enlarged cross-sectional view taken substantially along line 16—16 of FIGURE 4, and FIG. 17 is a schematic view illustrating the system for actuating the explosive charge.

Referring first to the embodiment illustrated in FIGURES 1 through 3, a steering assembly is generally disclosed at 10. The steering assembly 10 includes a column means, generally indicated at 12, and having first and second ends, generally indicated at 14 and 16 respectively. The ends 14 and 16 are interconnected by operative means for allowing relative movement between the ends 14 and 16 in response to a predetermined force. More specifically, the operative means includes steering shaft means, generally indicated at 18, and which includes first and second shaft members 20 and 22 respectively. The shaft members 20 and 22 are operatively connected for movement relative to one another in that the first shaft member 20 is disposed about and in splined telescoping relationship with the second shaft member 22.

The operative means also includes a restraining means which normally prevents relative telescoping movement between the shaft members 20 and 22 but allows such relative telescopic movement in response to a predetermined force. More specifically, a stub shaft 24 is attached by welding 26, or the like, to the first shaft member 20. The stub shaft 24 is rotatably supported in the bearing 28 and is adapted to support the steering wheel and cap 31. The operative means further includes the housing means 32 which is disposed about the shaft members 20 and 22. The housing means 32 is adapted by way of the flange 34 to be connected to a support structure, such as the frame or body of a vehicle as indicated at 36. The housing 32 includes an enlarged portion 38 which supports and is secured to the outer race of the bearing 28. The second shaft member 22 is rotatably supported by the bearing 40 and is prevented by the bearing 40 and flange 34 from moving longitudinally relative to the housing means 32. Since the first shaft member 20 is prevented from moving longitudinally relative to the housing means 32 because the bearing 28 is secured to the enlarged portion 38, there is included restraining means which normally prevents relative telescoping movement between the shaft members 20 and 22. It will be apparent to those skilled in the art that instead of utilizing the housing means 32 and bearings 28 and 40 to prevent relative movement between the shaft members 20 and 22, shear pins, or the like, may be utilized. Hereinafter it will become more clear that a predetermined force overcomes the restraining means to move the shaft members 20 and 22 relative to one another.

The housing means 32 includes an annular means 42 disposed about the first shaft member 20. The annular means 42 preferably supports a seal which engages the shaft member 20. A chamber 44 is defined by the annular means 42 and a piston 46. The annular means 42 is spaced from the piston 46 in the direction of the second shaft member 22 to form the chamber 44. The piston 46 is disposed on the first shaft member 20 and is slidably disposed in the housing means 32.

There is also included explosive means, generally indicated at 48, for providing a predetermined force to move the ends 14 and 16 relative to one another. More specifically, the explosive means 48 comprises a pyrotechnic device commonly referred to as a squib, or the like, which when activated creates gases which act against the piston 46 to move the piston into engagement with the bearing 28 to sever the securement between the outer race of the bearing 28 and the enlarged portion 38 of the housing means 32 so that the first shaft member 20 moves to the position illustrated in FIGURE 2. There is also included stop means comprising the enlarged or outwardly tapered portion 50 on the shaft member 20 which, as illustrated in FIGURE 2, engages the annular means 42 to limit the outward or extending movement of the shaft member 20. In other words, the stop means 50 limits the extension of the total effective length of the shaft members 20 and 22. As the shaft member 20 moves outwardly as a result of the activation of the explosive means 48, the outwardly tapered portion forming the stop means 50 is forced into wedging engagement with the annular means 42 to limit the extension of the shaft members 20 and 22 and, also, prevents relative movement in either direction between the first shaft member 20 and the housing means 32. After the explosive means 48 is actuated, therefore, the wedging engagement between the stop means 50 and the annular means 42 prevents the shaft member 20 from moving relative to and back into the housing means 32. Such a condition is illustrated in FIGURE 2.

In the embodiment illustrated in FIGURES 1 through 3, there is also included an energy absorbing means, generally indicated at 52, for absorbing energy while allowing the ends 14 and 16 to move relative to one another in response to a predetermined force regardless of whether the explosive means 48 is activated or not. More specifically, the energy absorbing means 52 comprises a corrugated portion which collapses and absorbs energy.

Thus, in the embodiment of FIGURES 1 through 3, there is included steering shaft means comprising the two shaft members 20 and 22 disposed in telescoping relationship with one another, restraining means normally preventing relative telescoping movement between the shaft members 20 and 22 and allowing relative telescopic movement in response to a predetermined force, the explosive means 48 being disposed relative to the shaft members 20 and 22 for extending the total length of the shaft members 20 and 22 upon activation or detonation thereof, and stop means 50 for limiting the extension of the shaft members 20 and 22. Thus, upon activation of the explosive means 48, pressure is applied against the piston 46 to move the first shaft member 20 away from the second shaft member 22 to extend the total effective length of the shaft members 20 and 22 to the extended position illustrated in FIGURE 2.

The steering column assembly 10 is adapted to be installed in a vehicle such as an automobile with a bracket 54 and/or member 36 providing support, i.e., a support structure. An appropriate sensing means is provided for activating the explosive means 48 in response to a predetermined condition of the vehicle such as the initial stages of a crash. Various well-known such sensing means may be utilized, such as accelerometers, inertia switches, or the like. An example of such a sensor is shown in Oldberg and Carey application Ser. No. 562,289, filed July 1, 1966, and assigned to the assignee of the present application. As shown schematically in FIG. 17, the sensor means 48a is in a circuit with the battery of the vehicle and the explosive means 48. Upon actuation of the sensor means 48a, it completes the circuit and explosive means 48 is energized.

The embodiment illustrated in FIGURES 1 through 3 when installed in a vehicle will collapse during sub-critical crashes. That is to say, the sensing means which activates the explosive means 48 is calibrated to activate the explosive means 48 at a predetermined operating condition of the vehicle such as when the vehicle is subjected to a certain number of G's, or G-forces. However, in the event the vehicle is in an operating condition which is not sufficient to activate the explosive means 48, yet wherein the operator moves forward to engage or impact with the steering wheel 30, the corrugated portion forming the energy absorbing means 52 will collapse to the position illustrated in FIGURE 3, thus allowing the steering wheel 30 to move forward. During this forward movement, the corrugated portion absorbs energy to gradually decelerate the forward movement of the operator.

Because of the relative position of the components in the embodiment illustrated in FIGURES 1 through 3, it is necessary to provide locking means for preventing relative movement between the housing means 32 and support structure 54 when the housing means 32 is attached thereto and which automatically allows relative movement between the housing means 32 and such support structure for allowing the energy absorbing means 52 to absorb energy. More specifically, the locking means includes (depending upon whether the housing means 32 is attached to a support structure) one or more of: a tapered pin 55, a leaf-type spring 57, and first and second abutments 59 and 61. Normally, the leaf spring 57 holds the tapered pin 55 in slight wedging engagement in a hole 63 in the housing means 32 for preventing longitudinal movement of the housing means 32 relative to a support structure such as the structure 54. When the explosive means 48 is activated, the pin 55 prevents movement of the housing means 32 to prevent elongation or collapse of the energy absorbing means 52 as the first shaft member 20 moves to the extended position illustrated in FIGURE 2. Once the first shaft member 20 is in the extended position, it is prevented from moving back into the housing means 32 because of the wedging engagement between the stop means 50 and the annular means 42. However, the first shaft member 20 and the housing means 32 move together toward the end 14 of the assembly as the operator of the vehicle moves forward because the abutment 59 engages and moves the tapered pin 55 sufficiently radially outward against the biasing of the spring 57 that movement of the housing means 32 engages the taper of the pin 55 to force the pin 55 out of the hole 63 so that it rides along the outside of the housing means 32 as the energy absorbing means 52 collapses to absorb energy. The assembly collapses during a sub-critical crash because the abutment 61 is disposed immediately adjacent, if not in engagement with, the tapered pin 55. There is enough movement in the assembly so that an impact on the steering column, as by the operator, moves the abutment 61 sufficiently to move the pin sufficiently outward so that movement of the housing means 32 completely moves the tapered pin 55 out of the hole 63. Thus, the column means collapses as the energy absorbing means absorbs energy. The abutment 61 does not move the pin 55 when the explosive means is activated because the first shaft member, hence the abutment 61, is urged to move outwardly away from the pin 55.

During a critical crash, the appropriate sensing means activates the explosive charge 48 whereby the shaft members 20 and 22 are extended to the position shown in FIGURE 2 so that the steering wheel is immediately adjacent the operator of the vehicle, thus significantly reducing or eliminating the impact force between the operator and the steering wheel as the operator begins to move forward during a crash. It has been determined, as a result of tests, that even in a front end crash of a vehicle, the operator does not begin to move forward any significant amount as a result of deceleration of the vehicle until a significant number of milliseconds after the crash begins. Thus, during this period, an appropriate sensing means fires the explosive charge 48 to move the steering wheel immediately adjacent the operator so that as the operator moves forward as a result of deceleration of the vehicle, there is immediate contact with the steering wheel, thus reducing or eliminating the impact therewith. When the operator and the steering wheel move forward together to the position illustrated in FIGURE 3, the corrugated portion forming the energy absorbing means 52 collapses to absorb the kinetic energy resulting from the forward movement of the operator and the steering wheel. Hence, the embodiment illustrated in FIGURES 1 through 3 is a steering column assembly which utilizes an explosive device to extend the steering column to move the steering wheel to a position immediately adjacent the operator of the vehicle and thereafter collapses and absorbs energy, and also collapses to absorb energy during a sub-critical crash wherein the explosive charge is not activated or detonated.

Another embodiment of the steering assembly of the instant invention is generally shown at 60 in FIGURES 4 through 8. The steering assembly 60 includes column means, generally indicated at 62, and having first and second ends 64 and 66 respectively. There is also included operative means interconnecting the ends 64 and 66 for allowing relative movement between the ends 64 and 66 in response to a predetermined force.

The operative means includes steering shaft means, generally indicated at 68. The steering shaft means includes first and second shaft members 70 and 72 respectively. The shaft members 70 and 72 are operatively connected in telescopic relationship with one another. The second shaft member 72 is disposed about the first shaft member 70 and the shaft members 70 and 72 are irregularly shaped along a portion thereof as best illustrated in FIGURE 7 to prevent relative rotation therebetween. The first shaft member 70 is adapted to be connected to the steering wheel 30.

The operative means also includes restraining means comprising the shear pins 74 which normally prevent relative telescoping movement between the shaft members 70 and 72 but allow relative telescopic movement therebetween in response to a predetermined force.

Also included in the operative means is a housing means comprising the casing 76 and the energy absorbing means, generally indicated at 78. The casing 76 may be attached to the support structure 80 at the end 64 and/or to the support structure comprising the brace 82. The brace 82 is of the type frequently utilized in automobiles.

The energy absorbing means 78 includes a first hollow member 84 which is adapted to be attached to a support 80 as indicated at 86. The first hollow member 84 includes U-shaped means comprising the reversely bent tabs 88 disposed at one end thereof. One leg of the U-shaped tabs 88 extends from the first hollow member 84. A second hollow member 90 is attached to the other legs of the U-shaped tabs 88 as by welding, brazing, or the like. The second hollow member 90 telescopes relative to the first hollow member 84 in response to a predetermined force to turn at least a portion of the first hollow member 84 inside out. More specifically, the first hollow member 84 has a plurality of weakened portions comprising the grooves 92 which extend longitudinally therealong and the tabs extend from alternate pairs of grooves 92 so as to be spaced from one another. The casing 76 includes an annular means 94 disposed about the second hollow member 90 for slidably supporting the second hollow member 90.

The embodiment illustrated in FIGURES 4 through 8, like the embodiment illustrated in FIGURES 1 through 3, will collapse during a sub-critical crash. In other words, as a predetermined force is applied against the end 66, i.e., when the operator is thrust against a steering wheel 30, the second hollow member 90 will telescope over the first hollow member 84 so that the U-shaped tabs 88 tear the hollow member 84 along the grooves 92 to extend the length of the legs of the U-shaped tabs 88 as illustrated in FIGURE 5. Energy is dissipated as the second hollow member 90 telescopes over the first hollow member 84 to turn at least portions of the first hollow member 84 inside out by ripping the hollow member 84 along the grooves 92.

In addition, the second hollow member 90 is formed to provide a piston 96 which coacts with the casing 76. Thus, a chamber is formed between the piston 96 and the annular means 94. Actually, as illustrated, a portion of the chamber is formed in the annular means 94. An explosive means, generally indicated at 98, is disposed in or in communication with the chamber between the piston 96 and the annular means 94. When the assembly is installed in an automobile and attached to an appropriate sensing device, the explosive means 98 is activated or detonated when the vehicle is in a predetermined operating condition so that the gas generated applies a force against the piston 96, which in turn pulls the second hollow member 90 along with the steering wheel 30 downward as the shearing pins 74 are sheared and the first shaft member 70 moves into the second shaft member 72. Whether the assembly is collapsed by a predetermined force being applied to the steering wheel 30 or the steering wheel 30 is moved or retracted as a result of a detonation of the explosive means 98 which supplies the predetermined force, the assembly, in either case, moves to the position illustrated in FIGURE 5. As the piston 96 moves downward within the casing 76, ambient air is expelled through the port 99. Also, as in the embodiment of FIGURES 1 through 3, the predetermined force applied to the steering wheel 30 to collapse the column means may or may not be of the same magnitude as the predetermined force applied by the explosive means.

Another preferred embodiment of the steering assembly of the instant invention is generally shown at 100 in FIGURES 9 through 12. The assembly 100 includes a column means, generally indicated at 102, and having first and second ends, generally indicated at 104 and 106 respectively. There is also included operative means interconnecting the ends 104 and 106 for allowing relative movement between the ends 104 and 106 in response to a predetermined force. More specifically, the operative means includes steering shaft means, generally indicated at 106, and comprising first and second shaft members 108 and 110. The shaft members 108 and 110 are operatively connected in telescoping relationship with one another and are prevented from rotating relative to one another by their irregular coacting shapes as best illustrated in FIGURE 10. There is also included restraining means comprising the shear pins 112 which normally prevent relative telescoping movement between the shaft members 108 and 110 but allow relative telescoping movement in response to a predetermined force.

The operative means further includes housing means, generally indicated at 114. The housing means 114 includes an annular means 116 disposed about the first shaft member 108. The annular means 116 is secured in position by a bolt 117. A piston 118 is disposed on the first shaft member 108 and retained thereto by a snap ring 120. The piston 118 coacts with the housing means 114 and a chamber 122 is formed between the piston 118 and the annular means 116. Actually, as shown the chamber 122 is disposed in the annular means 116. An explosive means 124 is disposed in communication with the chamber 122. Upon detonation of the explosive means 124, gases apply a force to the piston 118 to move the piston 118 away from the annular means 116 so that the first shaft member 108 is moved into further overlapping relationship with the second shaft member 110. The housing means 114 includes a deformable portion 125 which deforms to the position illustrated in FIGURE 11 when the shaft members 108 and 110 telescope together. The deformable portion 125 has high bending strength longitudinally and relatively low collapsing resistance.

As in the first embodiment, the shaft 108 is rigidly attached to and supports a stub shaft 126 which in turn is adapted to be attached to the steering wheel 30. There is also included means comprising the port 128 for exhausting ambient air as the piston 118 moves downward as well as gases created by activation of the explosive means 124 when the piston moves to the position illustrated in FIGURE 11. The assembly may be installed in a vehicle and supported by a brace 130 and/or may be supported at the end 104 by appropriate attachment of the member 132 to a support structure.

In addition, the embodiment illustrated in FIGURES 9 through 12 includes means for preventing the shaft members 108 and 110 from moving apart after having been moved together as a result of the activation of the explosive means 124, such means including coacting means, one of which is the outwardly tapered portion 134 and the other being the end portion 136 of the shaft member 108, which are forced into wedging engagement with one another. More specifically, the shaft member 110 includes the outwardly tapered portion 134 for deforming the end portion 136 of the shaft member 108 when the shaft members 108 and 110 are telescoped together upon activation of the explosive means 124. Thus, as illustrated in FIGURE 11, the end 136 of the first shaft member 108 is deformed as it is forced into wedging engagement with the tapered portion 134 of the shaft 110 to prevent rebound or return of the shaft 108 toward the initial position illustrated in FIGURE 9.

Thus, the embodiment illustrated in FIGURES 9 through 12 may be installed in a vehicle so that when a predetermined operating condition of the vehicle, such as the initial stages of a crash, is determined by an appropriate sensing means, the explosive means 124 is activated to move the shaft members 108 and 110 further into overlapping telescoping relationship, thus retracting the steering wheel 30. The steering wheel 30 is prevented from rebounding into the occupant of the vehicle because of the coacting wedging engagement between the shaft members 108 and 110 as indicated at 134 and 136. Also, in the event the coaction between the taper 134 and the end 136 of shaft member 108 does not prevent rebound, the piston ring about the piston 118 will have expanded and will engage the end of the upper housing member to prevent total rebound.

Another preferred embodiment of the steering assembly of the instant invention is generally shown at 150 in FIGURES 13 through 15. The steering assembly 150 includes column means, generally indicated at 152, and having ends 154 and 156. Operative means interconnects the ends 154 and 156 for allowing relative movement between the ends 154 and 156 in response to a predetermined force.

More specifically, the operative means includes steering shaft means, generally indicated at 157, and comprising the first shaft member 158 and the second shaft member 160. The shaft members 158 and 160 are operatively connected in telescoping relationship with one another. The operative means also includes a restraining means comprising the shear pins 162, 170 and 178 which normally prevent relative telescoping movement but allow the relative telescoping movement in response to a predetermined force. The shaft 158 is adapted at its outer end to be secured to the steering wheel 30.

The operative means further includes a housing means, generally indicated at 164. The housing means 164 includes casing members 166 and 168 which telescope one into the other but are normally prevented from telescoping one into the other by the shear pins 170. In the embodiment illustrated in FIGURES 13 through 15, the housing means 164 also includes the shifter members 172 and 174 which are adapted at 176 for connection to the transmission of a vehicle. The shifter members telescope one into the other when subjected to a predetermined force but are normally prevented from telescoping one into the other by the shear pins 178.

A piston 180 is disposed on the first shaft member 158 by a snap ring 181, as best illustrated in FIGURE 15. An annular means 182 is disposed about the first shaft member 158 and is secured to the shifter member 172. Thus, a chamber is formed between the piston 180 and the annular means 182. The piston 180 includes a pair of spaced parallel walls 184 which are interconnected by a base portion 186. As pressure increases, the outward wall 184 is urged into firm sealing engagement with the shifter member 172. An explosive means 188 is in communication with the chamber between the piston 180 and the annular means 182. The explosive means 188 is activated or detonated upon a predetermined condition for urging the first shaft members 158 into further overlapping relationship with the second shaft member 160 to retract the steering wheel 30 as the shear pins 162, 170 and 178 are sheared to allow the entire assembly to telescope together.

It will be noted that the casing member 166 of the housing is adapted to be attached to a support structure as indicated at 190.

The first shaft member 158 includes an outwardly tapered portion 192 which may deform the second shaft member 160 if the shaft members are telescoped together a sufficient distance upon activation of the explosive means 182. Thus, there is provided means for preventing the shaft members 158 and 160 from moving apart after being moved together by the explosive means 188. In other words, there is included the coacting means comprising the tapered portion 192 and the end 194 of the shaft member 160, which are forced into wedging engagement with one another if the shaft members 158 and 160 are telescoped a sufficient distance one into the other.

Frequently, upon the activation of the explosive means 188, the first shaft member 158 does not move into the second shaft member 160 sufficiently for the tapered portion 192 to engage the end of the second shaft member 160 because the first shaft member 158 rams against a portion of the vehicle structure such as a steering gear box which is normally disposed adjacent the end 154 of the column means. Accordingly, the first shaft member 158 has a first portion 159, which is slidably disposed in the second shaft member 160, and a second portion 161. The second portion 161 has a larger cross-sectional area than the first portion 159 as well as a different cross-sectional configuration than the first portion 159. More specifically, the first portion 161 has an oval-like cross-sectional configuration (i.e. circular with flats) whereas the second portion 161 has a circular cross-sectional configuration. The snap ring 181 comprises means securing the piston 180 to the second portion 161 of the first shaft member 158 and allows the piston 180 to move along the first shaft member 158 upon being subjected to the force resulting from the energy created by activation of the explosive means 188 and the inertia resulting when the first shaft member 158 suddenly stops moving as a result of ramming a part of the vehicle structure or the like. Therefore, in the event the first shaft member 158 suddenly stops or ceases moving before the tapered portion 192 engages the end of the second shaft member 160, the piston 180 dislodges or shears the snap ring 181 and moves along the second portion 161 and then along the first portion 159 to engage the end of the second shaft member 160. As the piston 180 moves along the first portion 159 there are spaces 163 between the piston 180 and the first portion 159 of the first shaft member 158, as best illustrated in FIGURE 16. Gases resulting from the activation of the explosive means 188 are therefore allowed to exhaust through the spaces 163 and out the port 165, thus providing a gas exhaust means. When the piston 180 engages the end of the second shaft member 160, it normally deforms the end of the second shaft member 160 into frictional gripping engagement with the first shaft member 158 to resist or prevent the shaft members from moving apart in the opposite direction, i.e., prevents rebound.

It will be understood, of course, that the unique and novel feature disclosed in FIGURES 9 through 15 wherein the shaft members are forced into coacting wedging engagement to prevent rebound, also has significant utility when used in any collapsible steering wheel for solving the rebound problem associated with collapsible steering column assemblies.

The embodiments of FIGURES 4 through 15 have particular utility when utilized in combination with a safety system in an automobile where during the initial stages of a crash gases inflate a bag immediately adjacent the occupant of the vehicle to cushion the forward movement of the occupant as a result of the deceleration. Such an inflatable bag may be disposed on the dashboard immediately in front of the operator of the vehicle and an appropriate sensing means is utilized to sequence the system so that the steering column is retracted out of the way to allow the bag to be inflated and move to engage the operator of the vehicle to prevent the operator of the vehicle from moving forward and contacting the instrument panel or windshield of the vehicle.

It will be understood that although only the embodiment illustrated in FIGURES 13 through 15 shows the shifter members 172 and 174, the other embodiments may also include shifter members for attachment to a vehicle transmission.

The invention has been described in an illustrative manner and it is to be understood that the terminology which has been used is intended to be in the nature of words of description rather than of limitation.

The embodiments of the invention in which an exclusive property or privilege is claimed are defined as follows:

1. A safety steering column assembly for a vehicle comprising a steering column member carrying a steering wheel, means supporting said steering column member and said steering wheel in a first position, and means for effecting movement of said steering column member and said steering wheel from said first position to protect an occupant of the vehicle during a collision, said means for effecting movement of said steering column member including a piston operatively associated with said steering column member and movable to effect movement of said steering column member and said steering wheel, and means providing a fluid pressure acting on said piston upon the vehicle encountering a collision condition to effect movement of said piston.

2. A safety steering assembly as defined in claim 1 further including means defining a fluid pressure chamber with said piston defining at least a part thereof, and said piston being mounted for movement along the longitudinal axis of said steering column to effect said movement of said steering wheel when a predetermined pressure is applied to said piston.

3. A safety steering assembly as defined in claim 1 wherein said means providing a fluid pressure comprises an explosive associated with said piston and which is activated upon said vehicle encountering a collision condition.

4. A safety steering assembly as defined in claim 1 wherein said piston upon movement effects movement of said steering wheel away from the occupant of the vehicle.

5. A steering assembly comprising column means including overlapping members normally disposed in a first position relative to one another and which move into further overlapping relationship with one another in response to a predetermined force, and coacting means which are forced into wedging engagement with one another as said overlapping members move into further overlapping relationship for preventing said overlapping members from returning toward said first position, said overlapping members comprising a first shaft member and a second shaft member, said first shaft member being operatively connected for movement relative to said second shaft member, said coacting means comprising an outwardly tapered portion on said first shaft member and the end portion of said second shaft member so that said tapered portion deforms the end portion of said second shaft member when said shaft members are moved together to prevent said shaft members from moving apart.

6. A safety steering assembly for a vehicle comprising a rotatable steering column member carrying a steering wheel, means supporting said steering column member and said steering wheel in a predetermined position, and explosive means for effecting movement of the steering column member and said steering wheel from said predetermined position during an accident.

7. A safety steering assembly as defined in claim 6 further including another rotatable steering column member movably connected with the one steering column member, and releasable means normally preventing relative movement between said steering column members and releasable to enable relative movement therebetween in response to a predetermined force thereagainst.

8. A safety steering assembly as defined in claim 6 further including steering column housing means for said steering column member, said housing means being collapsible upon vehicle operator impact thereagainst and absorbing energy upon collapse thereof.

9. A safety steering assembly as defined in claim 6 further including means for restraining rebound of said steering column member after movement thereof.

10. A safety steering assembly for a vehicle comprising steering means, means releasably supporting said steering means in a predetermined position to enable said steering means to steer the vehicle and be released due to impact of an operator of the vehicle thereagainst during a subcritical accident, and means for moving said steering means relative to the operator of the vehicle from said predetermined position prior to such impact of the operator of the vehicle with said steering means during a critical accident.

11. A safety steering assembly as defined in claim 9 wherein said means for moving said steering means comprises explosive means operatively associated therewith to effect movement thereof upon activation of said explosive means.

12. A safety steering assembly as defined in claim 11 wherein said explosive means moves said steering wheel in a direction away from the operator of the vehicle.

13. A safety steering assembly as defined in claim 11 wherein said explosive means moves said steering wheel in a direction toward the operator of the vehicle.

14. A steering assembly comprising a first member operatively connected with the steering wheel of the vehicle and a second member operatively connected with said first member, said second member having spaced tab portions fixedly secured at one end thereof to said first member, said tab portions extending longitudinally of the axis of rotation of the steering wheel and defined by weakened areas in said second member, said weakened areas releasing as said first member moves relative to said second member and the release of the weakened areas absorbing the energy of the force tending to move said first member relative to said second member.

15. A steering assembly as defined in claim 14 further including explosive means for moving said first member relative to said second member.

16. A steering assembly comprising column means including first and second ends, operative means interconnecting said ends for allowing relative movement between said ends in response to a predetermined force, explosive means for providing said predetermined force to move one of said ends relative to the other, said operative means including steering shaft means comprising at least two shaft members operatively connected for movement relative to one another, restraining means normally preventing relative movement between said shaft members and for allowing said relative movement in response to a predetermined force, said explosive means disposed relative to said shaft members for extending the total effective length of said shaft members upon activation thereof, and stop means for limiting the extension of the total effective length of said shaft members.

17. A steering assembly comprising column means including first and second ends, operative means interconnecting said ends for allowing relative movement between said ends in response to a predetermined force and explosive means for providing said predetermined force to move one of said ends relative to the other, said operative means including energy absorbing means for absorbing energy while allowing said ends of said column means to move relative to one another in response to a predetermined force regardless of whether said explosive means is activated.

18. An assembly as set forth in claim 17 wherein said operative means further includes steering shaft means comprising at least two shaft members operatively connected for movement relative to one another, restraining means normally preventing relative movement between said shaft members and allowing said relative movement in response to a predetermined force, and housing means surrounding at least a portion of said shaft members and including said energy absorbing means.

19. An assembly as set forth in claim 18 wherein said energy absorbing means comprises a corrugated portion which collapses and absorbs energy.

20. An assembly as set forth in claim 18 wherein a first of said shaft members is disposed about and in splined telescoping relationship with the second shaft member, a piston disposed on said first shaft member and slidably disposed in said housing means, said housing means including annular means disposed about said first shaft member and being spaced from said piston in the direction of said second shaft member to form a chamber therebetween, said explosive means being disposed in said chamber for moving said first shaft member away from said second shaft member to extend the total effective length of said shaft members upon activation of said explosive means said first shaft member having stop means thereon to engage said annular means for limiting the extension of said shaft members and for preventing relative movement between said first shaft member and said housing means upon activation of said explosive means, thereby providing an assembly in which said energy absorbing means absorbs energy as said second shaft member moves into said first shaft member in response to a predetermined force and in which said first shaft member moves away from said second shaft member upon activation of said explosive means to extend the total effective length of said shaft members after which said shaft members may telescope together in response to a predetermined force as said energy absorbing means absorbs the energy.

21. An assembly as set forth in claim 20 including locking means for preventing relative movement between said housing means and support structure when said housing means is attached thereto and for automatically allowing relative movement between said housing means and such support structure to allow said energy absorbing means to absorb energy.

22. An assembly as set forth in claim 18 wherein said energy absorbing means includes a first hollow member having U-shaped means extending therefrom, a second hollow member attached to said U-shaped means so that said hollow members may telescope relative to one another in response to a predetermined force for turning at least a portion of said first hollow member inside out.

23. An assembly as set forth in claim 22 wherein said first hollow member has a plurality of weakened portions extending longitudinally therealong and said U-shaped means comprises a plurailty of U-shaped tabs extending from said first hollow member and disposed between adjacent weakened portions.

24. An assembly as set forth in claim 23 wherein said weakened portions comprise spaced grooves extending longitudinally along said first hollow member, said tabs extending from a first end of said first hollow member and from alternate pairs of said grooves so as to be spaced from one another.

25. An assembly as set forth in claim 22 wherein said housing means includes a casing having annular means disposed about said second hollow member, said second hollow member having a piston coacting with said casing to define a chamber between said casing, said annular means, said second hollow member, and said piston, said explosive means being in communication with said chamber, said first and second shaft members being disposed in telescoping relationship with one another, whereby, upon activation of said explosive means, force is applied to said piston to telescope said second hollow member over said first hollow member to turn at least a portion of said first hollow member inside out as said restraining means allows said shaft members to telescope one into the other and whereby without the activation of said explosive means and in response to a predetermined force said restraining means allows said shaft members to telescope one into the other as said first hollow member is absorbing energy by being at least partially turned inside out while telescoping into said second hollow member.

26. An assembly as set forth in claim 25 wherein said first hollow member has a plurality of weakened portions extending longitudinally therealong and said U-shaped means comprises a plurality of U-shaped tabs extending from a first end of said first hollow member and disposed between adjacent weakened portions.

27. An assembly as set forth in claim 26 wherein said weakened portions comprise spaced grooves extending longitudinally along said first hollow member, said tabs extending from alternate pairs of said grooves so as to be spaced from one another.

28. A steering assembly comprising column means including first and second ends, operative means interconnecting said ends for allowing relative movement between said ends in response to a predetermined force, explosive means for providing said predetermined force to move one of said ends relative to the other, said operative means including steering shaft means comprising at least two shaft members operatively connected for movement relative to one another, restraining means normally preventing relative movement between said shaft members and allowing said relative movement in response to a predetermined force, said explosive means disposed relative to said shaft members for moving said shaft members together to shorten the total effective length of said shaft members upon the activation thereof, and means for preventing said shaft members from moving apart after being moved together by said explosive means.

29. An assembly as set forth in claim 28 wherein said last-mentioned means includes coacting means for being forced into wedging engagement with one another to prevent relative movement therebetween.

30. An assembly as set forth in claim 29 wherein said coacting means comprises an outwardly tapered portion on one of said shaft members and the end of the other shaft member so that said tapered portion deforms the end of the other shaft member when said shaft members are moved together upon activation of said explosive means.

31. An assembly as set forth in claim 28 wherein said operative means further includes housing means disposed about at least a portion of said shaft members, a piston disposed on a first of said shaft members and slidably disposed in said housing means, said housing means including annular means disposed about said first shaft member to define a chamber between said piston and said annular means, said explosive means being in communication with said chamber so that said first shaft member is moved into further overlapping relationship with said second shaft member to shorten the total effective length of said shaft members when said explosive means is activated.

32. An assembly as set forth in claim 31 wherein said piston includes a pair of spaced parallel walls interconnected by a base portion.

33. An assembly as set forth in claim 31 wherein said housing means includes means for exhausting gases created by the activation of said explosive means.

34. An assembly as set forth in claim 31 wherein said first shaft member is disposed about and in telescoping relationship with said second shaft member, said housing means adapted to be connected to a support structure and including at least a portion which deforms as said shaft members telescope together, said second shaft member having an outwardly tapered portion for deforming said first shaft member to prevent said shaft members from moving apart after being telescoped together as a result of the activation of said explosive means.

35. An assembly as set forth in claim 31 wherein said first shaft member is disposed within and in telescoping relationship with said second shaft member, said housing means includes members which telescope one into the other as said shaft members telescope together, said first shaft member having an outwardly tapered portion for engaging and deforming said second shaft member to prevent said shaft members from moving apart after being telescoped together as a result of the activation of said explosive means.

36. An assembly as set forth in claim 35 wherein said housing means includes telescoping shifter members adapted for connection to the transmission of a vehicle, said piston being slidably disposed in one of said shifter members, and telescoping casing members disposed about said shifter members, one of said casing members being adapted for connection to a support structure.

37. An assembly as set forth in claim 31 wherein said first shaft member is disposed within and in telescoping relationship with said second shaft member, said first shaft member having a first portion slidably disposed within said second shaft member and a second portion having a larger cross-sectional area than said first portion, means securing said piston to said second portion of said first shaft member and allowing said piston to move along said first shaft member upon being subjected to a second predetermined force, said first portion of said first shaft member having a different cross-sectional configuration from the cross-sectional configuration of said second portion thereof so that the activation of said explosive charge causes said piston to move said first shaft member into said second shaft member and whereby, upon the cessation of the movement of said first shaft member into said second shaft member to cause said second predetermined force to be applied to said piston, said means allows said piston to move along said second portion of said first shaft member and then along said first portion of said first shaft member while allowing gases resulting from the activation of said explosive charge to exhaust between said piston and said first portion of said first shaft member and thereafter to engage and deform said second shaft member into frictional gripping engagement with said first shaft member.

38. A safety steering assembly for a vehicle comprising a pair of releasably connected rotatable steering column members, one of said members carrying a steering wheel, means supporting said steering column members and said steering wheel in a predetermined position, means for extending said one steering column member relative to the other steering column member, and means for actuating said means for extending said one steering column member whereby said means for extending may be actuated to extend said steering shaft means for positioning the steering wheel immediately adjacent a vehicle operator during an accident.

39. In a vehicle, vehicle steering means, means supporting said vehicle steering means in a predetermined position to enable said vehicle steering means to steer the vehicle, explosive means operable upon activation for effecting movement of said steering means from said predetermined position, and explosive activating means for activating said explosive means.

40. In a vehicle, vehicle steering means, means releasably supporting said vehicle steering means for movement between a plurality of positions one of which enables the vehicle to be steered by an operator thereof, explosive means for moving said steering means from the one position to a second position whereat the steering means is inoperable to steer the vehicle and is disposed to prevent forceful impact of the operator thereagainst, and means for activating said explosive means.

41. In a vehicle as defined in claim 40 wherein said steering means is movable to a third position due to impact of the operator thereagainst and includes means for absorbing the kinetic energy of the operator.

42. In a vehicle as defined in claim 40 wherein said steering means moves in a direction toward the operator upon actuation of said explosive means.

43. In a vehicle as defined in claim 40 wherein said steering means moves in a direction away from the operator upon activation of said explosive means.

References Cited

UNITED STATES PATENTS

| | | | |
|---|---|---|---|
| 3,218,927 | 11/1965 | Stott | 60—26.1 X |
| 3,338,141 | 8/1967 | Ramsay | 60—26.1 X |
| 3,392,599 | 7/1968 | White | 74—492 |
| 3,394,612 | 7/1968 | Bogosoff et al. | 74—492 |
| 2,785,775 | 3/1957 | Stevinson | 188—1 |
| 2,836,079 | 5/1958 | Salch | 74—493 |
| 3,146,014 | 8/1964 | Kroell | 188—1 |

MILTON KAUFMAN, Primary Examiner

U.S. Cl. X.R.

60—26.1; 188—1

PO-1050
(5/69)

UNITED STATES PATENT OFFICE
CERTIFICATE OF CORRECTION

Patent No. 3,487,710                         Dated January 6, 1970

Inventor(s) Donald J. Fergle

It is certified that error appears in the above-identified patent and that said Letters Patent are hereby corrected as shown below:

In Claim 11 of the patent: Delete the numeral /9_7 and insert the numeral "10" in place thereof.

SIGNED AND
SEALED

OCT. 6, 1970

(SEAL)
Attest:

Edward M. Fletcher, Jr.
Attesting Officer

WILLIAM E. SCHUYLER, JR.
Commissioner of Patents